US012444523B2

(12) United States Patent
Kuribara et al.

(10) Patent No.: US 12,444,523 B2
(45) Date of Patent: Oct. 14, 2025

(54) RARE EARTH MAGNET ASSEMBLY AND PREPARATION METHOD

(71) Applicant: SHIN-ETSU CHEMICAL CO., LTD., Tokyo (JP)

(72) Inventors: Yuta Kuribara, Echizen (JP); Kazuhito Akada, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/581,238

(22) Filed: Jan. 21, 2022

(65) Prior Publication Data

US 2022/0254552 A1 Aug. 11, 2022

(30) Foreign Application Priority Data

Feb. 9, 2021 (JP) ................................ 2021-018902

(51) Int. Cl.

*H01F 1/057* (2006.01)
*C22C 38/00* (2006.01)
*H01F 41/02* (2006.01)

(52) U.S. Cl.

CPC ......... *H01F 1/0577* (2013.01); *C22C 38/005* (2013.01); *H01F 41/0293* (2013.01); *C22C 2202/02* (2013.01)

(58) Field of Classification Search

None

See application file for complete search history.

(56) References Cited

U.S. PATENT DOCUMENTS

2008/0050581 A1* 2/2008 Miwa ...................... C23C 22/73 427/255.19
2012/0036696 A1* 2/2012 Murakami ............. H02K 15/03 29/426.2
2012/0182103 A1* 7/2012 Miyabara ............. H01F 7/0221 335/302
2012/0274165 A1* 11/2012 Fukaya ................. H01F 41/005 310/156.01
2021/0146709 A1* 5/2021 Kuribara .............. B41M 5/0047

FOREIGN PATENT DOCUMENTS

JP 5-33740 U 5/1993
JP 2011-193621 A 9/2011
JP 2015-61328 A 3/2015
WO WO 2010/038748 A1 4/2010
WO WO-2019004368 A1 * 1/2019 .......... B41M 5/0047

OTHER PUBLICATIONS

How does heat shrink tape work? (Year: 2022).*
Japanese Office Action for corresponding Japanese Application No. 2021-018902, dated Oct. 17, 2023, with English translation.

* cited by examiner

*Primary Examiner* — Xiaowei Su
(74) *Attorney, Agent, or Firm* — Birch, Stewart, Kolasch & Birch, LLP

(57) ABSTRACT

An assembly of rare earth magnet pieces is prepared by placing two rare earth magnet pieces at their side surfaces in abutment so that top surfaces of magnet pieces are disposed adjacent to each other across the abutment interface, and forming a coating on the adjacent surfaces of magnet pieces, the coating continuously extending across abutment interface and over adjacent surfaces for thereby tightly joining the abutted magnet pieces together.

8 Claims, 2 Drawing Sheets

RARE EARTH MAGNET ASSEMBLY AND PREPARATION METHOD

CROSS-REFERENCE TO RELATED APPLICATION

This non-provisional application claims priority under 35 U.S.C. § 119(a) on Patent Application No. 2021-018902 filed in Japan on Feb. 9, 2021, the entire contents of which are hereby incorporated by reference.

TECHNICAL FIELD

This invention relates to a rare earth magnet assembly having a plurality of rare earth magnet pieces, typically Nd—Fe—B sintered magnet pieces joined together, and a method for preparing the same.

BACKGROUND ART

While Nd—Fe—B sintered magnets are generally prepared by compacting powdered alloy material under pressure and sintering the compact, they find typical use in electric motors for automobiles. The electric motor includes a rotor core composed of laminated steel sheets and magnets. Unless the magnet is fully insulated from the laminated steel sheet, eddy current generated in the magnet will flow via the laminated steel sheet to another magnet inserted in an adjacent slot, resulting in a relatively large loop of eddy current. Since the magnet temperature is elevated by the eddy current, there arise problems like a heat loss and lowering of magnetic properties. It is then difficult to obtain electric motors of the desired performance.

As one countermeasure to the outstanding problems of electric motors. Patent Document 1 proposes to form a coating on the surface of a Nd—Fe—B sintered magnet to improve insulation and corrosion resistance, for thereby suppressing eddy current.

Typical surface treatments for imparting insulation to Nd—Fe—B sintered magnet include spray coating and electrodeposition of resin material. In the case of spray coating, a certain loss of coating material which does not deposit on the object occurs because of spraying. While thermosetting resins are generally used in spray coating and electrodeposition, they must be heated by a heater for drying or baking after coating. The heating furnace used in this step consumes substantial amounts of time and energy for resin curing. A large footprint is necessary for the installation of the furnace. This prior art technology tends to increase the cost of surface treatment of magnet.

One suitable technique for reducing the cost of surface treatment is to form a coating of UV-curable resin. Since the UV-curable resin cures with UV radiation, a coating can be formed with the advantages of short time, low cost and space saying, as compared with the heat cure in the heating furnace. The known method of coating a magnet body with UV-curable resin includes the steps of immersing the magnet body in liquid resin, spinning the magnet body to remove extraneous uncured component, and irradiating UV radiation for curing. By contrast, the inkjet system is known as the means for more uniform coating. The inkjet system is successful in forming a uniform coating or film with the advantages of short time, low cost and simple steps. As a result, magnet is readily endowed with insulation.

As another countermeasure to the outstanding problems of electric motors, it is known to divide a magnet into a plurality of segments. Dividing a Nd—Fe—B sintered magnet within a slot into a plurality of magnet segments makes it possible to physically inhibit the conduction of electrons and suppress eddy current. Since the number of magnet segments increases as a result of division, the assembling process including inserting magnet segments into a slot becomes cumbersome, i.e., a decline of workability. To overcome the problem, the technique of bonding a plurality of magnet segments with an adhesive and the technique of securing a plurality of magnet segments with an insulating tape (e.g., Patent Document 2) are devised.

CITATION LIST

Patent Document 1: JP-A 2011-193621

Patent Document 2: JP-A 2015-061328

DISCLOSURE OF INVENTION

Both the technique of bonding a plurality of divided magnet segments with an adhesive and the technique of securing a plurality of divided magnet segments with an insulating tape as described in Patent Document 2 have shortcomings including low dimensional accuracy and laborious working.

An object of the invention is to provide a method for preparing a rare earth magnet assembly by joining a plurality of magnet pieces together, the method being capable of joining a plurality of magnet pieces in a simple way and simultaneously imparting corrosion resistance and insulation, and a rare earth magnet assembly prepared thereby.

In an attempt to prepare a rare earth magnet assembly by joining a plurality of rare earth magnet pieces, the inventors have reached the method involving the steps of placing two rare earth magnet pieces at their side surfaces in abutment, and forming a coating on the adjacent surfaces of the magnet pieces, the coating continuously extending across the abutment interface and over the adjacent surfaces, for thereby tightly joining the abutted magnet pieces together. The method is successful in joining magnet pieces together into a magnet assembly through the coat-forming step which is simple and needs a relatively low cost. At the same time, the coating thus formed imparts corrosion resistance and insulation to the magnet assembly.

In one aspect, the invention provides a method for preparing an assembly of rare earth magnet pieces, comprising the steps of:

placing two rare earth magnet pieces at their side surfaces in abutment so that top surfaces of the magnet pieces are disposed adjacent to each other across the rim of the abutment interface, and forming a coating on at least a portion of the adjacent surfaces of the magnet pieces, the coating continuously extending across the rim of the abutment interface and over the adjacent surfaces, for thereby tightly joining the abutted magnet pieces together.

It is noted that the term "two magnet pieces" is used for the sake of simplicity of description and the inventive method is applicable to the joining of two, three or more magnet pieces into an assembly.

In a preferred embodiment, one of the two magnet pieces is an assembly of previously joined magnet pieces, or both are such assemblies.

The method may further comprise the steps of furnishing an inkjet system having a drop projecting head, projecting drops of a resin composition from a head nozzle to deposit the resin composition on the adjacent surfaces of the magnet pieces, and curing the deposited resin composition to complete the coating. Preferably, the steps of projecting drops of a resin composition to deposit the resin composition on the adjacent surfaces of the magnet pieces and curing the deposited resin composition are repeated plural times to form the coating.

In a preferred embodiment, the resin composition is a UV-curable resin composition, and the curing step includes irradiating UV radiation to the resin composition deposited on the adjacent surfaces for thereby curing the resin composition.

In a preferred embodiment, the rare earth magnet assembly is an assembly of substantially rectangular parallelepiped shape having plural surfaces including the rim of the abutment interface, and the coating is formed on at least two of the plural surfaces.

In a preferred embodiment, a primer is applied to at least a portion of the adjacent surfaces of magnet pieces on which a coating is to be formed and/or the coating preformed on the adjacent surfaces of magnet pieces, before the coating is formed.

In another aspect, the invention provides a rare earth magnet assembly comprising at least two rare earth magnet pieces which are abutted at their side surfaces to define an abutment interface, and a coating which is formed on at least a portion of adjacent top surfaces of the magnet pieces and continuously extends across the rim of the abutment interface and over the adjacent top surfaces to tightly join the magnet pieces together.

In preferred embodiments, the coating has an average thickness of 30 to 90 μm; and the coating has a pencil hardness of at least 6H according to JIS K 5600.

Advantageous Effects of Invention

The method is successful in tightly joining magnet pieces together at a high dimensional accuracy into a magnet assembly in a simple and inexpensive manner and at the same time, imparting corrosion resistance and insulation to the magnet assembly.

DESCRIPTION OF PREFERRED EMBODIMENTS

Figure 1A:
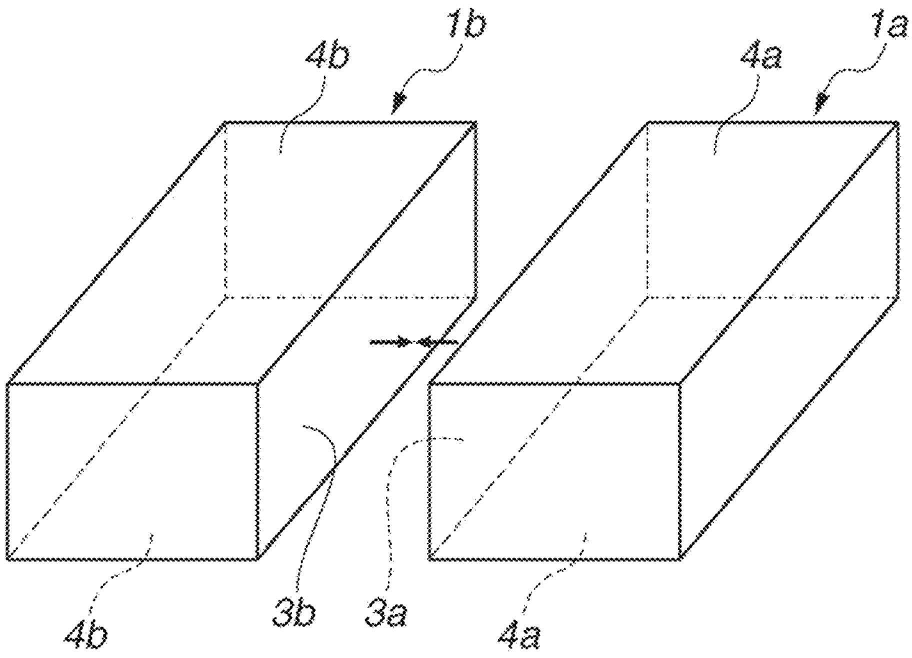
FIG. 1A is a schematic perspective view for illustrating one embodiment of the method for preparing a rare earth magnet assembly according to the invention.

In the following description, like reference characters designate like or corresponding parts throughout the several views shown in the figures. It is also understood that terms such as "top," "bottom," and the like are words of convenience and are not to be construed as limiting terms.

The invention provides a method for preparing a rare earth magnet assembly by forming a coating on the surfaces of abutted rare earth magnet pieces for thereby tightly joining or tying the magnet pieces together.

Figure 1B:
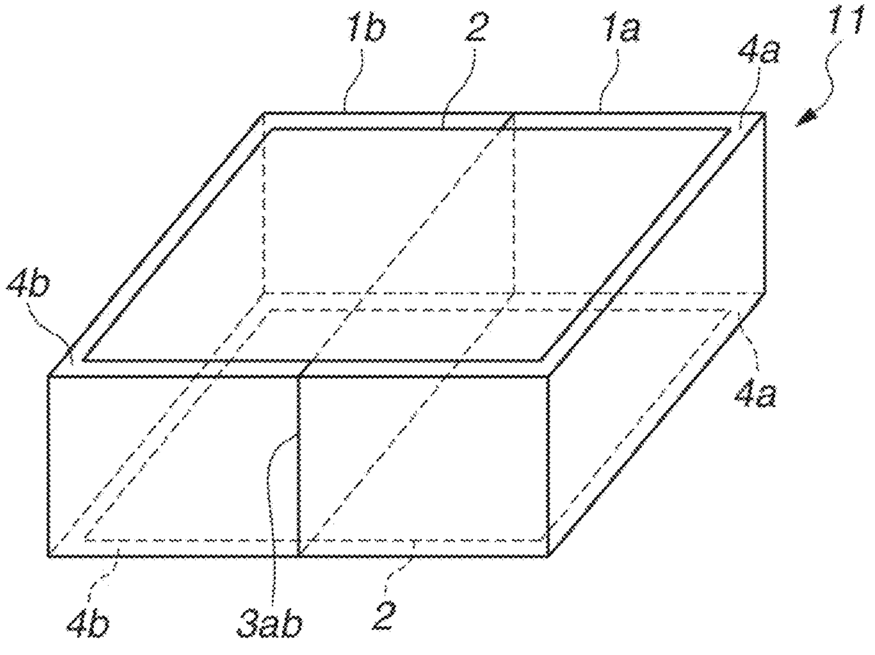
FIG. 1B is a schematic perspective view for showing an exemplary rare earth magnet assembly.

Referring to FIGS. 1A and 1B, it is described how to join rare earth magnet pieces together into an assembly. As shown in FIG. 1A, there are furnished two rare earth magnet pieces 1*a*, 1*b* of substantially rectangular parallelepiped shape having opposed side surfaces 3*a*, 3*b*, top surfaces 4*a*, 4*b*, and bottom surfaces 4*a*, 4*b*. The magnet pieces 1*a*, 1*b* are placed in abutment at side surfaces 3*a*, 3*b* to define an abutment interface 3*ab*. In the abutted state, the top or bottom surfaces 4*a*, 4*b* of magnet pieces 1*a*, 1*b* are disposed adjacent to each other across the rim of abutment interface 3*ab*. Then, as shown in FIG. 1B, a coating 2 is formed on at least a portion (a major portion of two adjacent surfaces in FIG. 1B) of the adjacent top surfaces 4*a*, 4*b* of abutted magnet pieces 1*a*, 1*b*. A coating 2 is also formed on at least a portion (a major portion of two adjacent surfaces in FIG. 1B) of the adjacent bottom surfaces 4*a*, 4*b* of abutted magnet pieces 1*a*, 1*b*. Each coating 2 continuously extends across the rim of abutment interface (or junction) 3*ab* and over the adjacent surfaces 4*a*, 4*b*. The top and bottom coatings 2, 2 tightly join or tie two magnet pieces 1*a*, 1*b* together to produce a rare earth magnet assembly 11.

With respect to the formation of a coating on the surface of magnet piece, when the magnet assembly 11 is a rectangular parallelepiped, it is preferred from the standpoint of bonding strength that coatings 2, 2 are formed on two or more surfaces of the magnet assembly including the rim of abutment interface (junction) 3*ab*, specifically two surfaces 4*a*+4*b*, 4*a*+4*b* of the magnet assembly 11 as shown in FIG. 1B. The area of coating 2 is preferably as large as possible from the standpoint of imparting bonding strength, corrosion resistance and insulation, though not particularly limited.

Although a pair of magnet pieces 1*a*, 1*b* of the same shape and size are joined into the magnet assembly 11 in FIGS. 1A and 1B, the magnet pieces may have different shape and/or size and three or more magnet pieces may be joined into the magnet assembly 11. Further, one or both of the magnet pieces to be joined may be an assembly of previously joined magnet pieces. In this embodiment, the assembly of previously joined magnet pieces may be either an assembly in which magnet pieces are joined by forming a coating according to the inventive method or an assembly in which magnet pieces are otherwise joined.

Although the rare earth magnet subject to the joining method is not particularly limited, sintered magnets such as Nd—Fe—B sintered magnets and SmCo sintered magnets are preferred. Since magnet pieces are secured by forming a coating thereon, the shape of rare earth magnet pieces is preferably such that their surfaces to be coated and to be joined are planar, most preferably a rectangular parallelepiped.

The means of forming the coating is not particularly limited. Any of well-known spray and other coating techniques is applicable. For obtaining the desired effect, for example, an inkjet system of projecting drops of a resin composition through a head nozzle is applicable. The preferred resin composition is a UV-curable resin composition.

Now the coating forming step in one embodiment of the inventive method is described with reference to the formation of a coating by the inkjet system using a UV-curable resin composition. The procedure of forming a coating by the inkjet system includes the steps of (A) projecting drops of a UV-curable resin composition through a head nozzle toward the surface of rare earth magnet pieces to deposit the drops on the surface and (B) irradiating UV radiation to the UV-curable resin composition deposited on the magnet surface to cure the resin.

In steps (A) and (B), as described in conjunction with FIGS. 1A and 1B, the UV-curable resin composition is coated on and cured to the adjacent surfaces 4*a*, 4*b* of magnet pieces 1*a*, 1*b* which are disposed adjacent to each other with respect to the abutment interface (or junction) 3_ab_ between magnet pieces 1_a_ and 1_b_, the coating continuously extending across the rim of the abutment interface (or junction) 3_ab_ and over the adjacent surfaces 4_a_, 4_b_ of magnet pieces 1_a_, 1_b_. Then two magnet pieces 1_a_, 1_b_ are tightly joined together by the mechanical strength of UV-cured resin and the bonding strength of UV-cured resin to the magnet surface. When three or more magnet pieces are joined, the coating continuously extends over the adjacent surfaces of three or more magnet pieces.

The thickness (or average thickness) of the coating is typically at least 30 μm, preferably at least 40 μm, more preferably at least 50 μm and typically up to 90 μm, preferably up to 80 μm, more preferably up to 70 μm, but not limited thereto. A coating thickness within the range provides a good balance of corrosion resistance and insulation, ensuring that the resulting magnet assembly has a sufficient electric resistance as the motor-mount magnet, for example.

In step (A), using the inkjet system of projecting drops through a head nozzle, drops of a UV-curable resin composition are projected through a nozzle toward the surface of magnet pieces to deposit the resin composition on the magnet surface. An apparatus having the inkjet system incorporated therein is generally known as inkjet printer and adapted to atomize a liquid coating material, project microscopic drops, and deposit drops directly on the surface of an object. There are commercially available not only printers for printing ink images to paper or other sheets, but also printers of projecting an uncured resin composition instead of ink and depositing drops directly on the surface of an object. The latter is also called inkjet printers. The inkjet system includes two types, the continuous type wherein a stream of fluid is continuously released and the drop-on-demand type wherein coating fluid is projected when necessary. The drop-on-demand type is subdivided into two types, the piezo type of expelling drops of coating fluid with a piezoelectric device and the thermal type of projecting fluid ink with the aid of bubbles created by heating. In the practice of the invention, preference is given to the drop-on-demand technology wherein the size reduction of the device is allegedly easy, especially the drop-on-demand technology of piezo type because some UV-curable resin compositions can be cured by heat.

Now that a UV-curable resin is used to form a coating and the inkjet system is applied to project the UV-curable resin composition, a uniform coating can be formed. This establishes a uniform bonding strength and minimizes dimensional errors of the magnet assembly. By repeating steps (A) and (B), the coating thickness and bonding strength are increased.

The resolution at which the UV-curable resin composition is deposited by the inkjet system is preferably at least 300 dpi, more preferably at least 600 dpi, most preferably at least 1,000 dpi. As the resolution is higher and the size of drops is smaller, irregularities of a coating and uncovered areas such as pinholes become less, the coating density becomes higher, and hence, the bonding strength becomes higher. Since the increase of coating density brought by resolution enhancement has more or less impact on the internal stress in the coating, most often the resolution is preferably up to 1,200 dpi. Notably, either one drop or two or more drops may deposit onto one dot.

On use of the inkjet system, the volume of drops is selected depending on the thickness of a coating and the resolution. With the properties and production efficiency of a coating taken into account, one drop preferably has a volume of at least 3 pL, more preferably at least 6 pL, and up to 20 pL, more preferably up to 12 pL, even more preferably up to 10 pL. The UV-curable resin composition from which drops are created preferably has a viscosity at 25° C. of at least 17 mPa/s and up to 27 mPa/s. For the purpose of improving the adhesion of a coating, a primer layer may be formed, in part or in entirety, on the coating-receptive surface of magnet pieces, prior to the deposition of the UV-curable resin composition, though this is not critical. In this connection, when one of magnet pieces to be joined is an assembly of two or more magnet pieces previously joined by a coating formed by the inventive method or both are such assemblies, the primer layer may be formed on the previous coating.

When a coaling is formed by the inkjet system, the coating density may be increased by controlling the resolution and the volume of drops. The coating density is preferably at least 1.15 g/cm$^3$, more preferably at least 1.17 g/cm$^3$, and up to 1.21 g/cm$^3$, more preferably up to 1.19 g/cm$^3$. A coaling density in the range ensures that failures such as coating strip-out and cracking are effectively suppressed while maintaining a high bonding force. A good balance of corrosion resistance and insulation is also ensured. It is noted that the coating density is calculated from the thickness and weight of a coating formed on a predetermined area.

As compared with conventional bonding with an adhesive, the inventive method of preparing a rare earth magnet assembly has the advantage that it dispenses with dimensional tailoring such as surface polishing because adhesive oozing or migration does not occur. In addition, the magnet assembly can be prepared through the single coating step because the steps of applying the adhesive, securing magnet pieces in place, and drying or heating to cure the adhesive are unnecessary.

The UV-curable resin which is used as the resin for forming a coating in one embodiment undergoes photochemical reaction with the energy of UV radiation and cures from liquid to solid within a time of the second order. The UV-curable resin composition (uncured UV-curable resin) typically contains a photo-polymerizable compound (monomer or resin precursor) as a main component, a photo-polymerization initiator, a colorant, adjuvants and the like. Examples of the photo-polymerizable compound include radical type acrylic monomers adapted to polymerize by cleavage of a double bond as well as cation type epoxy monomers, oxetane monomers, and vinyl ether monomers, but are not limited thereto. In the case of radical type, polymerization takes place through the mechanism that the photo-polymerization initiator is decomposed upon light exposure to generate radicals, which react with the monomer to create new radicals. Exemplary of the photo-polymerization initiator are aromatic ketones. In the case of cation type, polymerization takes place through the mechanism that the photo-polymerization initiator is decomposed upon light exposure to generate an acid, which reacts with the monomer to create new active cation species. Exemplary of the photo-polymerization initiator is triallylsulfonium cation, hexalluorophosphate or the like. Exemplary of the colorant is carbon black, which contributes to an improvement in the visibility of magnet after coating formation.

In step (B), UV radiation is irradiated to the UV-curable resin composition deposited on the magnet piece surface to cure the resin composition. The UV radiation is selected appropriate depending on the type of UV-curable resin composition used. UV with wavelength of the order of 200 to 380 nm is generally used. For example, mercury lamps, UV-LED lamps, and xenon lamps may be used for UV emission.

One embodiment of the inventive method is a coating forming method based on the inkjet system including steps (A) and (B), which may be carried out as the following embodiments (1) and (2).

Embodiment (1)

In step (A), while the head nozzle is traversed in proximity to the magnet pieces, drops of the UV-curable resin composition are sequentially projected to the coating-receptive surface of abutted magnet pieces such that the drops are connected contiguous. Contiguously connected drops are deposited on a portion or the entirety of the adjacent surfaces (e.g., 4*a*, 4*b* in FIG. 1B) of abutted magnet pieces. There is formed a continuous thin layer of the UV-curable resin composition which extends across the abutment interface or junction (e.g., 3*ab* in FIG. 1B) between abutted magnet pieces. Then step (B) is carried out to cure the thin layer of the UV-curable resin composition to form a coating, which connects and ties the magnet pieces to tightly join them together. For the purpose of forming a thicker coating, steps (A) and (B) may be repeated plural times to lay thin films of the UV-curable resin composition one on top of the other to form a multilayer coating.

Embodiment (2)

In step (A), drops of the UV-curable resin composition are projected from the head nozzle, after which step (B) is carried out on the drops in succession or at any time. The head nozzle is moved to a position next to the cured drops of the resin composition before steps (A) and (B) are carried out. The operation is repeatedly carried out over the range where a coating is to be formed while the head nozzle is traversed in proximity to the surface of the magnet pieces. In consequence, a continuous coating of the UV-curable resin composition is formed on a portion or the entirety of the adjacent surfaces (e.g., 4*a*, 4*b* in FIG. 1B) of abutted magnet pieces so as to bridge over the abutment interface or junction (e.g., 3*ab* in FIG. 1B) between abutted magnet pieces.

No particular limit is imposed on the time when UV irradiation or cure is initiated after drops of the UV-curable resin composition are deposited on the magnet surface. From the standpoint of preventing any troubles such as variations of coating thickness as a result of drops agglomerating together, preference is given to embodiment (2) wherein drops are cured substantially at the same time as they are deposited (for example, within a duration from immediately after projection to immediately after deposition).

In embodiment (2) wherein UV radiation is irradiated substantially at the same time as drops are deposited on the magnet surface, a UV irradiating section is preferably located forward of or in proximity to the head nozzle for projecting drops of the UV-curable resin composition. The UV irradiating section may be mounted integrally with or separately from the head nozzle. For example, when a UV cure type inkjet printer having a UV irradiating section, which is integral with or separate from the head nozzle, located forward of or in proximity to the head nozzle for projecting drops of the UV-curable resin composition is used, the UV-curable resin composition can be cured just where drops thereof are projected from the head nozzle. This is advantageous over the coating formation by spray coating that includes drying and heat treatment steps which are carried out on a separate unit. When the timing of UV irradiation is controllable, UV radiation may be irradiated after a certain time of holding from the deposition of drops. Then UV radiation may be irradiated without moving the head nozzle or after the head nozzle is moved to a position next to the drops of the resin composition deposited.

In the other case wherein UV radiation is irradiated after a certain time of holding from the deposition of drops on the magnet surface, particularly in the case of Embodiment (1), a UV emitter such as a UV lamp is provided separately from the inkjet printer. Step (B) may be carried out by irradiating UV radiation in one pass to drops of the UV-curable resin composition or a thin layer formed as a result of drops of the UV-curable resin composition connecting together, after a certain time of holding if necessary.

When steps (A) and (B) are carried out, it is preferred to form a coating in a serial manner without moving or taking out the magnet pieces, as viewed from the standpoint of acquiring a satisfactory junction and dimensional accuracy. When an inkjet printer is used, for example, steps (A) and (B) can be carried out in a serial manner without the risk of displacement of magnet pieces. Using a jig or the like, dimensional errors are reduced.

The coating-receptive surfaces of magnet pieces are typically placed perpendicular to the projection direction of drops. In the case of magnet pieces of rectangular parallelepiped shape, for example, when a coating is formed on top surfaces of magnet pieces, the coating connects and ties only the top surfaces of magnet pieces, which means that the abutment interface is not completely secured and it is difficult to handle magnet pieces as an integral assembly. Therefore, coatings are preferably formed on two or more surfaces of a magnet assembly as seen from coatings 2, 2 on the magnet assembly 11 shown in FIG. 1B. To form coatings on two surfaces of a magnet assembly, once a coating is formed on top surfaces of magnet pieces, the temporary magnet assembly is turned and a coating is formed on the former bottom (now top) surfaces of magnet pieces. If a gap is left between adjacent surfaces of magnet pieces due to warpage of the coating or other causes, effective joining is not achieved. The spacing between adjacent surfaces of magnet pieces should preferably be as small as possible.

In the method of forming a coating by the inkjet system, both when drops of the UV-curable resin composition are projected from the head nozzle in step (A) and when UV radiation is irradiated in step (B), the surfaces of magnet pieces may be inclined from the perpendicular direction to the projection direction of drops. In the case of magnet pieces of rectangular parallelepiped shape, for example, the surfaces of magnet pieces are inclined 45° from the perpendicular direction whereby adjoining two-side surfaces of magnet pieces (two adjoining surfaces of a magnet assembly) can be treated at a time. When the surfaces of magnet pieces are inclined from the perpendicular direction to the projection direction of drops, Embodiment (2) is preferably applied.

The coating thus formed should preferably have a pencil hardness of at least 6H according to JIS K 5600 though the hardness is not critical. The coating with such hardness is not readily strippable and provides a satisfactory bonding strength.

The bonding force between magnet pieces in the magnet assembly prepared by the method may be evaluated by carrying out a three-point flexural test on AG-I 250 kN (Shimadzu Corp.) to measure bending strength. An average bending strength of at least 60 N is preferred though not critical.

EXAMPLES

Examples of the invention are given below by way of illustration and not by way of limitation.

Example 1

There were furnished Nd—Fe—B sintered magnet pieces of rectangular parallelepiped shape (14.23 mm×7.06 mm×5.16 mm). A pair of magnet pieces were abutted by a jig. Using a UV-LED curable flatbed inkjet printer UJF-6042 MkII (Mimaki Engineering Co., Ltd.), as shown in FIG. 1(B), a coating 2 was formed on adjacent surfaces 4*a*, 4*b* of two magnet pieces 1*a*, 1*b* which were disposed adjacent to each other with respect to the abutment interface (junction) 3*ab* between two magnet pieces 1*a*, 1*b*. The coating extended across the rim of the abutment interface (junction) 3*a,b* and over the adjacent surfaces 4*a*, 4*b* of two magnet pieces 1*a*, 1*b*. The coating 2 was formed of a UV-curable resin composition based on an acrylate and containing hexamethylene diacrylate as a reaction diluent, a polymerization initiator, and carbon black as a colorant. The inkjet printer was set to project drops of the UV-curable resin composition having a volume of 10 pL, and to a resolution of 1200 dpi×1200 dpi. The coating forming step was performed as follows.

While the head nozzle of the printer was traversed in proximity to the top surfaces of magnet pieces 1*a*, 1*b*, drops of the UV-curable resin composition were successively projected to one continuous surface (total area 14.23 mm×14.12 mm) consisting of two adjacent surfaces 4*a*, 4*b* of two abutted Nd—Fe—B sintered magnet pieces 1*a*, 1*b* in its entirety. Immediately after a thin layer of the UV-curable resin composition was formed, UV was irradiated to complete a coating of the resin composition. Thereafter, the magnet pieces were turned 180 degrees, and a coating was formed on the former bottom surfaces by the same procedure as above. In this way, coatings were formed on two opposed surfaces to form an assembly of Nd—Fe—B sintered magnet pieces. This operation was carried out on three pairs of Nd—Fe—B sintered magnet pieces, obtaining three rare earth magnet assemblies.

Figure 2:
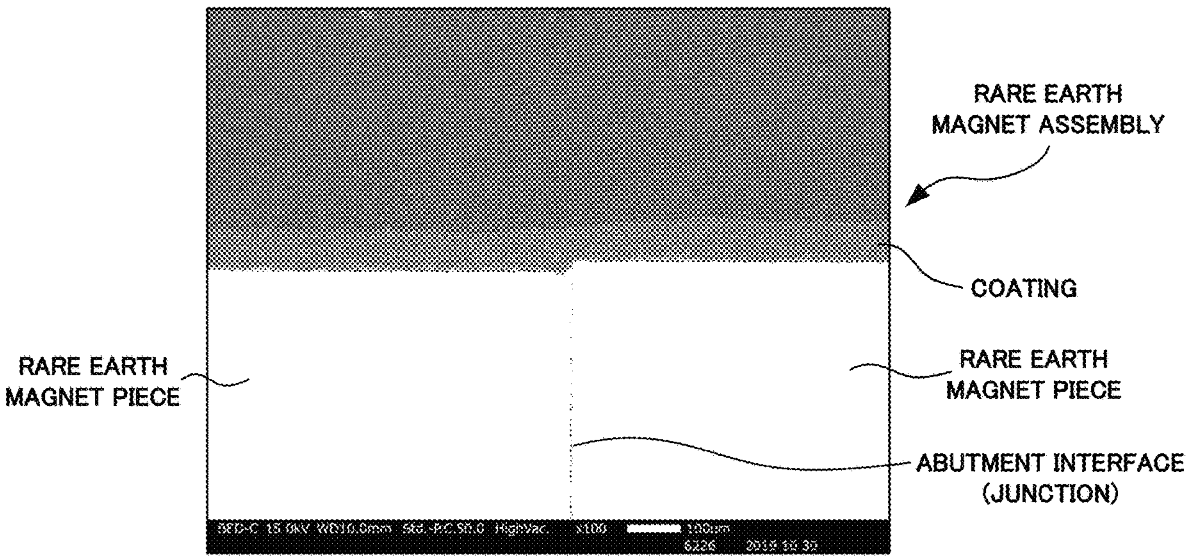
FIG. 2 is a SEM photomicrograph showing a coating extending across the junction in the rare earth magnet assembly prepared in Example 1.

The Nd—Fe—B sintered magnet assemblies were evaluated for bonding force by carrying out a three-point flexural test on AG-I 250 kN (Shimadzu Corp.) to measure bending strength. An average bending strength of 114.5 N was obtained, which is a sufficient strength for use in electric motors. Also, the coating was measured for hardness by a pencil hardness meter according to JIS K 5600, finding a hardness of at least 6H. A cross section of the assembly was observed under a scanning electron microscope (SEM). As seen from FIG. 2, some of the UV-cured resin of the coating infiltrated into a gap at the junction. It is noted that the dense grey area appearing above the coating in FIG. 2 is the background and not any part of the magnet assembly.

Thirty (30) rare earth magnet assemblies were prepared by the same procedure as above. The size of magnet assemblies was measured by Digimatic Caliper (Mitutoyo Corp.). The size before and after the joining step was compared to find a variation within ±0.8%. The size of the assembly perpendicular to the coating-bearing surfaces, which included the coating thickness and coating surface roughness, had a variation within ±0.8% whereas the size of the assembly perpendicular to the uncoated surfaces had a smaller variation within ±0.5%. It was demonstrated that magnet assemblies with satisfactory dimensional accuracy were obtained.

Next, for examining the heat resistance of a coating, the magnet assembly was heated in an oven at 160° C. for 24 hours. The magnet assembly was taken out of the oven and its surface was visually observed to find no substantial changes. Also, the magnet assembly was sandwiched between electrodes, compressed under 7 MPa, and coupled to a resistance meter. With this setup, measurement was made to find a satisfactory electric resistance of 1 MΩ or higher.

For examining the state of a coating, a UV-cured resin coating of 10 mm×10 mm was formed on a rectangular Nd—Fe—B sintered magnet piece of 29 mm×18 mm×2 mm under the same conditions as in Example 1. The thickness of the entire UV-cured resin coating was measured by Digimatic Caliper (Mitutoyo Corp), finding an average thickness of 81.6 μm. From the area of the coating-bearing surface, the thickness of the coating, and a weight change of magnet before and after coating formation, the density of the coating was calculated to be 1.18 g/cm$^3$.

Example 2

Three rare earth magnet assemblies were prepared as in Example 1 except that the drops of the UV-curable resin composition had a volume of 6 pL and the resolution was 600 dpi×600 dpi.

The Nd—Fe—B sintered magnet assemblies were evaluated for bonding force by carrying out a three-point flexural test on AG-I 250 kN (Shimadzu Corp.) to measure bending strength. An average bending strength of 66.3 N was obtained, which is a sufficient strength for use in electric motors. Also, the coating was measured for hardness by a pencil hardness meter as in Example 1, finding a hardness of at least 6H. A cross section of the assembly was observed under SEM, finding that some of the UV-cured resin infiltrated into a gap at the junction.

Thirty (30) rare earth magnet assemblies were prepared by the same procedure as above. The size of magnet assemblies was measured by Digimatic Caliper (Mitutoyo Corp.). The size before and after the joining step was compared to find a variation within ±0.8%. The size of the assembly perpendicular to the coating-bearing surfaces, which included the coating thickness and coating surface roughness, had a variation within ±0.8% whereas the size of the assembly perpendicular to the uncoated surfaces had a smaller variation within ±0.5%. It was demonstrated that magnet assemblies with satisfactory dimensional accuracy were obtained.

Next, for examining the heat resistance of a coating, the magnet assembly was heated in an oven at 160° C. for 24 hours. The magnet assembly was taken out of the oven and its surface was visually observed to find no substantial changes. Also, the magnet assembly was sandwiched between electrodes, compressed under 7 MPa, and coupled to a resistance meter. With this setup, measurement was made to find a satisfactory electric resistance of 1 MΩ or higher.

For examining the state of a coating, a UV-cured resin coating of 10 mm×10 mm was formed on a rectangular Nd—Fe—B sintered magnet piece of 29 mm×18 mm×2 mm under the same conditions as in Example 2. The thickness of the entire UV-cured resin coating was measured by Digimatic Caliper (Mitutoyo Corp.), finding an average thickness of 42.3 μm. From the area of the coating-bearing surface, the coating thickness, and a weight change of magnet before and after coating formation, the density of the coating was calculated to be 1.17 g/cm$^3$.

Example 3

Three rare earth magnet assemblies were prepared as in Example 1 except that the drops of the UV-curable resin composition had a volume of 8 pL.

The Nd—Fe—B sintered magnet assemblies were evaluated for bonding force by carrying out a three-point flexural test on AG-I 250 kN (Shimadzu Corp.) to measure bending strength. An average bending strength of 64.1 N was obtained, which is a sufficient strength for use in electric motors. Also, the coating was measured for hardness by a pencil hardness meter as in Example 1, finding a hardness of at least 6H. A cross section of the assembly was observed under SEM, finding that some of the UV-cured resin infiltrated into a gap at the junction.

Thirty (30) rare earth magnet assemblies were prepared by the same procedure as above. The size of magnet assemblies was measured by Digimatic Caliper (Mitutoyo Corp.). The size before and after the joining step was compared to find a variation within ±0.8%. The size of the assembly perpendicular to the coating-bearing surfaces, which included the coating thickness and coating surface roughness, had a variation within ±0.8% whereas the size of the assembly perpendicular to the uncoated surfaces had a smaller variation within ±0.5%. It was demonstrated that magnet assemblies with satisfactory dimensional accuracy were obtained.

Next, for examining the heat resistance of a coating, the magnet assembly was heated in an oven at 160° C. for 24 hours. The magnet assembly was taken out of the oven and its surface was visually observed to find no substantial changes. Also, the magnet assembly was sandwiched between electrodes, compressed under 7 MPa, and coupled to a resistance meter. With this setup, measurement was made to find a satisfactory electric resistance of 1 MΩ or higher.

For examining the state of a coating, a UV-cured resin coating of 10 mm×10 mm was formed on a rectangular Nd—Fe—B sintered magnet piece of 29 mm×18 mm×2 mm under the same conditions as in Example 3. The thickness of the entire UV-cured resin coating was measured by Digimatic Caliper (Mitutoyo Corp.), finding an average thickness of 65.8 μm. From the area of the coating-bearing surface, the coating thickness, and a weight change of magnet before and after coating formation, the density of the coating was calculated to be 1.18 g/cm$^3$.

Japanese Patent Application No. 2021-018902 is incorporated herein by reference. Although some preferred embodiments have been described, many modifications and variations may he made thereto in light of the above teachings. It is therefore to be understood that the invention may be practiced otherwise than as specifically described without departing from the scope of the appended claims.

The invention claimed is:

1. A method for preparing a rare earth magnet assembly, comprising the steps of:

placing two rare earth magnet pieces so that two rare earth magnet pieces are abutted at their side surfaces to define an abutment interface, and top surfaces of the magnet pieces are disposed adjacent to each other across the rim of the abutment interface;

applying a UV-curable resin composition on at least a portion of the adjacent top surfaces of the magnet pieces, so that the UV-curable resin composition continuously extends across the rim of the abutment interface and over the adjacent top surfaces; and curing the UV-curable resin composition by irradiating UV radiation to the UV-curable resin composition to form a coating of cured resin to join the magnet pieces together so that the two rare earth magnet pieces are directly contacted to each other at the abutment interface, and the coating has a pencil hardness of at least 6H according to JIS K 5600.

2. The method of claim 1 wherein one or both of the two magnet pieces is an assembly of previously joined magnet pieces.

3. The method of claim 1, further comprising the steps of:

furnishing an inkjet system having a drop projecting head;

projecting drops of the UV-curable resin composition from a head nozzle to deposit the UV-curable resin composition on the adjacent top surfaces of the magnet pieces; and curing the deposited UV-curable resin composition by irradiating the UV radiation to form the coating.

4. The method of claim 3 wherein the steps of projecting drops of the UV-curable resin composition to deposit the UV-curable resin composition on the adjacent top surfaces of the magnet pieces and curing the deposited UV-curable resin composition are repeated plural times to form the coating.

5. The method of claim 1 wherein the rare earth magnet assembly has a rectangular shape having plural surfaces including the rim of the abutment interface.

6. The method of claim 1 wherein a primer is applied to i) at least a portion of the adjacent top surfaces of the magnet pieces on which the coating is to be formed and/or ii) at least a portion of a coating previously formed on the adjacent top surfaces of magnet pieces of an assembly, where one or both of the two magnet pieces is the assembly of previously joined magnet pieces.

7. A rare earth magnet assembly comprising at least two rare earth magnet pieces which are abutted at their side surfaces to define an abutment interface, and a coating of cured resin formed on at least a portion of adjacent top surfaces of the magnet pieces and continuously extending across the rim of the abutment interface and over the adjacent top surfaces to join the magnet pieces together, wherein the at least two rare earth magnet pieces are directly contacted to each other at the abutment interface, the coating has a pencil hardness of at least 6H according to JIS K 5600, and the coating is formed by curing a UV-curable resin composition by irradiating UV radiation to the UV-curable resin composition.

8. The rare earth magnet assembly of claim 7 wherein the coating has an average thickness of 30 to 90 μm.

* * * * *